United States Patent
Patwardhan et al.

(10) Patent No.: US 12,234,529 B2
(45) Date of Patent: *Feb. 25, 2025

(54) LITHIUM EXTRACTION PROCESS AND APPARATUS

(71) Applicant: U.S. Borax Inc., Wilmington, DE (US)

(72) Inventors: Amit Patwardhan, Wilmington, DE (US); Sandip Shinde, Wilmington, DE (US); Allen Wattenbarger, Wilmington, DE (US); Daniel Suasnabar, Wilmington, DE (US)

(73) Assignee: U.S. Borax Inc., Wilmington, DE (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/255,143

(22) PCT Filed: Dec. 1, 2021

(86) PCT No.: PCT/US2021/061406
§ 371 (c)(1),
(2) Date: May 31, 2023

(87) PCT Pub. No.: WO2022/119921
PCT Pub. Date: Jun. 9, 2022

(65) Prior Publication Data
US 2024/0102130 A1    Mar. 28, 2024

(30) Foreign Application Priority Data
Dec. 2, 2020   (WO) ................ PCT/US2020/062855

(51) Int. Cl.
C22B 26/12    (2006.01)
C22B 1/06     (2006.01)
(Continued)

(52) U.S. Cl.
CPC ................ C22B 26/12 (2013.01); C22B 1/06 (2013.01); C22B 1/2406 (2013.01); C22B 3/04 (2013.01);
(Continued)

(58) Field of Classification Search
None
See application file for complete search history.

(56) References Cited

U.S. PATENT DOCUMENTS

| 3,131,022 A | 4/1964 | Archambault |
| 8,431,005 B1 | 4/2013 | Zbranek et al. |

(Continued)

FOREIGN PATENT DOCUMENTS

CN    110395751 A    11/2019

OTHER PUBLICATIONS

Mar. 2, 2021—(WO) International Search Report and Written Opinion—App PCTUS20/62855.
(Continued)

*Primary Examiner* — Colin W. Slifka
(74) *Attorney, Agent, or Firm* — Boyle Fredrickson S.C.

(57) ABSTRACT

A method of extracting lithium from a lithium-bearing material including: (i) mixing the lithium-bearing material, gypsum, a sulfur-containing material, and a calcium-containing material and forming a feed mixture having a moisture content of at least 20 wt %; (ii) drying the feed mixture to form a dried mixture having a moisture content of less than 20 wt %; (iii) roasting the dried mixture and forming a roasted mixture including a water-soluble lithium compound; and (iv) leaching lithium from the water-soluble lithium compound and forming a lithium-containing leachate by mixing the aqueous solution and the water-soluble lithium compound.

18 Claims, 2 Drawing Sheets

(51) Int. Cl.
  *C22B 1/24* (2006.01)
  *C22B 1/26* (2006.01)
  *C22B 3/02* (2006.01)
  *C22B 3/04* (2006.01)
  *C22B 7/00* (2006.01)

(52) U.S. Cl.
  CPC ............... *C22B 7/006* (2013.01); *C22B 1/26* (2013.01); *C22B 3/02* (2013.01)

(56) References Cited

U.S. PATENT DOCUMENTS

| | | |
|---|---|---|
| 2006/0171869 A1 | 8/2006 | Anovitz et al. |
| 2013/0206607 A1 | 8/2013 | Kojima et al. |

OTHER PUBLICATIONS

Pittuck et al., "Technical Report on the Feasability Study for the Sonora Lithium Project, Mexico", Ausenco Services Pty. Ltd., Jan. 25, 2018.
Feb. 25, 2022—(WO) International Search Report and Written Opinion—App PCT/US21/61406.
Crocker et al. "Lithium and Its Recovery From Low-Grade Nevada Clays"; <Https://www.osti.gov/biblio/6809674-lithium-its-recovery-from-low-grade-nevada-clays-bulletin>; 1987.
May 3, 2023—(US) Non-final Office Action—U.S. Appl. No. 17/539,775.
Apr. 21, 2023—(WO) International Preliminary Report on Patentability—App PCT/US20/62855.
Apr. 20, 2023—(WO) International Preliminary Report on Patentability—App PCT/US21/61406.

LITHIUM EXTRACTION PROCESS AND APPARATUS

CROSS-REFERENCE TO RELATED APPLICATIONS

This application is a U.S. National Stage application under 35 U.S.C. § 371 of International Application PCT/US2021/061406 (published as WO 2022/119921), filed on Dec. 1, 2021, which claims the benefit of priority to PCT Application No. PCT/US2020/062855, filed on Dec. 2, 2020. Each of these prior applications is hereby incorporated by reference in its entirety.

FIELD OF INVENTION

The invention relates to a process and an apparatus for extracting lithium from a lithium-bearing material.

In particular, although by no means exclusively, the invention relates to a process and an apparatus for extracting lithium from low grade lithium-bearing material such as waste material from borates mining or clay formations.

BACKGROUND

Lithium is used to make batteries for a variety of applications including electric cars, cameras and mobile phones.

Lithium is obtained by either extracting lithium-containing salts from underground brine reservoirs or mining lithium-containing rock.

One example of lithium-containing rock is in deposits in borates mines, with lithium being in waste rock/clay and tailings generated from the borates mining and recovery process.

Low value gangue material typically ends up in a tailings dam or in a stacked heap. The tailings and stacked heaps have low concentrations of lithium that cannot be extracted economically at the present time. The lithium in the 30 tailings and stacked heaps, whilst low grade, is a potential asset that may be unlocked economically later with current technology or with improving technology. The amounts of tailings and waste rock generated during mining can be significant and, hence, the potential lithium value can be significant.

Lithium is also present, typically in low concentrations, in clay formations and, to date, it has been challenging to extract lithium from these formations in an economically viable way.

There are a number of known processes for extracting lithium from lithium-containing materials.

However, it has been challenging to extract lithium in a practical and economic way from low grade lithium bearing material such as tailings, waste rock and clay formations described above.

It would be desirable for a process to extract lithium from low grade lithium-bearing material.

The above description is not an admission of the common general knowledge in Australia or elsewhere.

SUMMARY OF INVENTION

The present invention provides a process for extracting lithium from lithium-bearing material, particularly low grade lithium-bearing waste material.

The lithium-bearing material may be a sediment-hosted deposit.

The sediment-hosted deposit may be waste tailings 30 obtained from an industrial processing plant such as a primary process plant, a boric acid processing plant or a borates mine. The waste tailings may have been subjected to acid or water leaching. The sediment-hosted deposit may comprise lithium bearing clay minerals.

The lithium bearing clay minerals may be processed or treated clay for example clay minerals found in the waste material from a processing plant which may have been processed, for example, by leaching.

The lithium bearing clay minerals may be virgin clay such as untreated or natural clay, for example obtained from clay formations.

Examples of clay minerals include smectites such as hectorite and/or montmorillonite, Bigadic clays, and lithium bearing illite with or without lithium zeolites.

The lithium-bearing material may be material in which lithium is associated with high concentrations of sodium, aluminum, silicon and/or boron. Typically, the lithium-bearing material comprises 8-32 wt % of sodium, aluminium, silicon, potassium and/or boron per kg of lithium-bearing material. Suitably, the lithium-bearing material is a boron-containing ore.

The expression "low grade" refers to a lithium concentration ranging from 1-3 g/kg of lithium-bearing material.

The present invention provides a method of extracting lithium from a lithium-bearing material including:
  i) mixing the lithium-bearing material, gypsum, a sulfur-containing material, and a calcium-containing material and forming a feed mixture having a moisture content of at least 20 wt %;
  ii) drying the feed mixture to form a dried mixture having a moisture content of less than 20 wt %;
  iii) roasting the dried mixture and forming a roasted mixture including a water-soluble lithium compound; and
  iv) leaching lithium from the water-soluble lithium compound and forming a lithium-containing leachate by mixing the aqueous solution and the water-soluble lithium compound.

The present invention also provides a method of extracting lithium from a lithium-bearing material including:
  (i) mixing the lithium-bearing material, gypsum, a sulfur-containing material, and a calcium-containing material and forming a feed mixture having a moisture content of at least 20 wt %;
  (ii) drying the feed mixture to form a dried mixture having a moisture content of less than 20 wt %;
  (iii) supplying the dried mixture to a roaster;
  (iv) roasting the dried mixture in the roaster and forming a roasted mixture including a water-soluble lithium compound;
  (v) supplying the water-soluble lithium compound to a leach tank;
  (vi) supplying an aqueous solution to the leach tank; and
  (vii) leaching lithium from the water-soluble lithium compound and forming a lithium-containing leachate by mixing the aqueous solution and the water-soluble lithium compound in the leach tank.

One advantage of the present invention is that it provides a lithium extraction process that can extract value from waste material, for example waste rock and tailings, generated from a variety of industrial processes including, but not limited to, borates mining.

Another advantage of the present invention is that it provides a lithium extraction process that reduces the operating cost of the process. The roasting step in a known lithium extraction method is recognised as a key driving factor for operational costs. The present invention replaces part of the gypsum used in the known roasting step with a functionally-equivalent substance (i.e. the sulfur-containing material including elemental sulfur or an alkali metal sulfate, such as sodium or potassium sulfate) that can be generated on-site or in-situ to reduce the operating cost.

A further advantage of the present invention is that it provides a process that uses an environmentally benign substance, water, in the extraction process instead of highly acidic solutions. This is achieved by a roasting step in which Li-silicate from clays is converted into $Li_2SO_4$ which is water soluble.

The applicant also discovered that roasting wet feed mixture having a moisture content of at least 20 wt % has the potential to increase lithium recovery by at least 5%. Testwork showed that lithium recovery using roasted feed material could exceed 80% whereas dry mixing of unroasted material typically had a lithium recovery of about 70%.

The sulfur-containing material may be either or a combination of an alkali metal sulfate and elemental sulfur.

The alkali metal sulfate may be either or a combination of sodium sulfate and potassium sulfate. Suitably, the alkali metal sulfate is sodium sulfate.

The alkali metal sulfate may be obtained from an effluent waste stream of a processing plant.

Suitably, the alkali metal sulfate is obtained from boric acid plant liquor or tailings pond.

The calcium-containing material may be either or a combination of calcium carbonate such as limestone or dolomite, and lime. The calcium-containing material may be substituted with magnesium carbonate.

The calcium-containing material may have maximum particle size of 88 microns (−170 mesh). Suitably, the maximum particle size is 74 microns (−200 mesh). More suitably, the maximum particle size is 63 microns (−230 mesh).

The method may include a comminution step to form calcium-containing material having a maximum particle size of 88 microns (−170 mesh).

The method may include screening the calcium-containing material to form calcium-containing material having a maximum particle size of 88 microns (−170 mesh).

The gypsum may have maximum particle size of 88 microns (−170 mesh). Suitably, the maximum particle size of gypsum is 74 microns (−200 mesh). More suitably, the maximum particle size of gypsum is 63 microns (−230 mesh).

The method may include a comminution step to form gypsum having a maximum particle size of 88 microns (−170 mesh).

The method may include screening the gypsum to form calcium-containing material having a maximum particle size of 88 microns (−170 mesh).

The mixing step may involve mixing wet lithium-bearing material with gypsum, a sulfur-containing material, and a calcium-containing material and forming the feed mixture. Suitably, the wet lithium-bearing material has a water content ranging from 20-60 wt %. More suitably, the wet lithium-bearing material has a water content ranging from 40-50 wt %.

Existing technology for extracting lithium from lithium-bearing material typically requires the feed material to be substantially dry (e.g. less than 10 wt % moisture) before they are mixed. It can be appreciated that such technology is not appropriate for processing waste gangue material, for example, from a tailings pond because this material is usually moisture rich. Energy would have to be expended to dry the feed material in preparation for the mixing step, often making the process uneconomically viable.

The mixing step may involve adding an aqueous solution, preferably water, to lithium-bearing material having a water content of less than 20 wt % to form the feed mixture.

The mixing step may form a mixture having a composition in which the gypsum:sulfur-containing material ratio is at least 1:1 (e.g. 1 kg gypsum:1 kg sodium sulfate).

Suitably, the amount of gypsum:sulfur-containing material ratio is at least 2:1 (e.g. 2 kg gypsum:1 kg sodium sulfate).

Suitably, the gypsum:sulfur-containing material ratio is at least 3:1 (e.g. 3 kg gypsum:1 kg sodium sulfate).

Even more suitably, the gypsum:sulfur-containing material ratio is 7:3 (e.g. 7 kg gypsum: 3 kg sodium sulfate).

The applicant has discovered that <30% substitution of gypsum with a sulfur-containing material delivers lithium recoveries comparable to gypsum-only mixtures but at reduced operating costs.

The applicant discovered that complete substitution of gypsum with sodium sulfate resulted in a lithium recovery of less than 25%.

The mixing step may form a mixture having a predetermined composition comprising lithium-bearing material:calcium-containing material:gypsum:sulfur-containing material at a ratio of lithium-bearing material (1):calcium-containing material (0.4-0.8):gypsum (0.3-0.5):sulfur-containing material (0.1-0.3). Suitably, the mixing step forms a mixture comprising lithium-bearing material:calcium-containing material:gypsum:sulfur-containing material at a ratio of 100:45-75:20-50:10-25.

The above ratios for calcium-containing material may apply to calcium carbonate such as limestone or dolomite, and lime.

The above sulfur-containing material ratios are particularly suitable for sodium sulfate. In this respect, a skilled person would understand that adjustments may have to be made to the ratios if a different sulfur-containing material, for example potassium sulfate, is used.

The mixing step may include mixing the feed mixture for a minimum of 5 minutes. Suitably, the feed mixture is mixed for a minimum of 10 minutes. More suitably, the feed mixture is mixed for minimum of 20 minutes.

The mixing step may include mixing the feed mixture from 15-45 minutes. Suitably, the mixing step includes mixing the feed mixture for 15 minutes.

The mixing step may be performed at a speed ranging from 10-80 rpm. Suitably, the mixing step is performed at a speed ranging from 15-70 rpm.

The mixing step may be performed in a high shear intensity mixer. Suitably, the high shear intensity mixer is a Eirich high intensity mixer.

Suitably, the mixing step forms a homogeneous mixture. It was determined that controlling the mixing speed and/or time enables the formation of the homogeneous mixture and may facilitate the formation of granules (or pellets) for roasting.

The mixing step may include drying of the homogeneous mixture to reduce its moisture content to less than 15 wt %, suitably less than 10 wt % to form a granulated mixture.

The drying step may reduce the moisture content of the feed mixture and form a granulated mixture. Suitably, the drying step reduces the moisture content of the feed mixture to less than 15 wt %, suitably less than 10 wt %.

Suitably, the granules have a mean diameter less than 30 mm. More suitably, the granules have a mean diameter less than 20 mm. Even more suitably, the granules have a mean diameter less than 10 mm.

The granules may have a mean diameter ranging from 5-20 mm.

The granules may have a moisture content of less than 15 wt %. Suitably, the granules may have a moisture content of less than 10 wt %. More suitably, the granules may have a moisture content of less than 5-10 wt %.

The method may include a granulating step to process the mixture into granules. The granulating step may be part of the mixing step or separate to the mixing step.

The granulating step may include drying the feed mixture to reduce its moisture content to less than 20 wt %. Suitably, the granulating step includes drying the feed mixture to reduce its moisture content to a maximum of 15 wt %. More suitably, the granulating step includes drying the feed mixture to reduce its moisture content to a maximum of 10 wt %.

The roasting step may be performed at a roasting temperature ranging from 800-1,000° C.

Suitably, the roasting step is performed at a roasting temperature ranging from 850-950° C.

More suitably, the roasting step is performed at a roasting temperature ranging from 857-925° C. Even more suitably, the roasting step is performed at a roasting temperature of 900° C.

The roasting step may be performed for a roasting time period ranging from 15 mins to 2 hours. Suitably, the roasting step is performed for a roasting time period ranging from 20 minutes to 1 hour.

The roasting time period is the time period during which the mixture is exposed to the roasting temperature. This roasting time period may be different to the residence time of the mixture in a kiln or furnace where the mixture may not be exposed to the roasting temperature for its entire residence time in the kiln or furnace. For example, the mixture may be exposed to a varying temperature profile as it is conveyed through a kiln. In this example, the roasting time period when the mixture is conveyed to a location in the kiln where is it exposed to the roasting temperature.

The roasting step may be performed at a roasting temperature ranging from 800-1,000° C. for a roasting time period ranging from 15 minutes to 2 hours.

When the mixture is roasted in a kiln, the roasting step is performed at a roasting temperature of 850° C. for a roasting time period ranging from 20 minutes to 1 hour. In the kiln, the mixture goes through a drying process in a first zone wherein it will gradually reach the target temperature. Once it reaches the target temperature, the material is exposed to the target temperature for 20 to 30 minutes.

When the mixture is roasted in a crucible placed in a furnace, the roasting step is performed at a roasting temperature of 900° C. for a roasting time period of 1 hour.

Sulfur-containing material including sodium, potassium and calcium sulfates may be generated during the roasting step. It can also be appreciated that unreacted sulfur-containing material may also be present in the roasted material. As this material is an ingredient of the roasting recipe, recycling this material back into the mixer reduces feed material costs.

As such, the method may include a step of adding sulfur-containing material from the roasting step to the mixing step.

The method may include a step of adding sulfur-containing material, typically in the form of sodium sulfate, obtained from crystallisation of the lithium-containing leachate to the mixing step. This sulfur-containing material can be used as a reagent to partially replace gypsum in the mixing step.

The water-soluble lithium compound may be lithium sulfate.

The method may include a step of crushing the water-soluble lithium compound before the leaching step. Suitably, the crushing step involves reducing the particle size of the water-soluble lithium compound to 1,000-5,000 µm (1-5 mm). More suitably, the particle size of the water-soluble lithium compound ranges from 1,000-3,000 µm (1-3 mm).

The leaching step may include adding an aqueous solution to the roasted mixture to form a slurry having a solids content ranging from 20-50 wt %, suitably, a solids content ranging from 25-45 wt %, more suitably, a solids content ranging from 30-40 wt %.

The method may include counter-current leaching of the lithium from the water-soluble lithium compound. Suitably, the method may include two or more counter-current leaching steps. Other appropriate leaching methods include co-current leaching, use of drum filters and simple leaching.

The countercurrent leaching step may form a lithium-containing leachate having a lithium concentration of at least 300 ppm.

In this specification, the aqueous solution used in the leaching step may have a pH ranging from 6.5-7.5. Suitably, the pH of the aqueous solution is 7.

It can be appreciated that while it is preferred that the aqueous solution used in the process has a pH of 7, the process can also utilise water from a variety of sources which may contain minerals or substances that causes the pH to deviate from 7 by ±0.5.

The leaching step may be performed at a temperature less than 60° C. Suitably, the leaching step is performed at a temperature less than 50° C. More suitably, the leaching step is performed at a temperature ranging from 20-40° C.

The method may include filtering the slurry to remove undissolved solids such as calcium carbonate and clay. Suitably, the filtering step generates a lithium-containing leachate having a lithium concentration of at least 2,000 ppm.

The method may include concentrating the leachate.

The concentrating step may involve evaporating part of the leachate to form a concentrated leachate having a lithium concentration of at least 3,000 ppm.

Suitably, the concentrating step involves evaporating part of the leachate to form a concentrated leachate having a lithium concentration of at least 4,000 ppm.

More suitably, the concentrating step involves evaporating part of the leachate to form a concentrated leachate having a lithium concentration of at least 4,500 ppm.

The concentrating step may result in the formation of impurities including calcium and sodium salts and/or particulate matter including thenardite, glaserite, glauberite, or anhydrite.

The method may include filtering the concentrated lithium-containing leachate to remove the impurities.

The filtered concentrated lithium-containing leachate may be processed via a series of steps to form lithium carbonate. The applicant has developed a process of forming lithium carbonate 25 from the filtered concentrated lithium-containing leachate which is the subject of International patent application PCT/US2020/062844 filed on the same day as the present application by the same applicant, the disclosure of which is incorporated in its entirety.

The method may include recycling alkali metal sulfate (e.g. sodium sulfate) formed during the roasting step to supplement the sulfur-containing material in the feed material.

The invention also provides an apparatus to perform the previously described method.

In one form, the invention provides an apparatus for extracting lithium from a lithium-bearing material comprising:
(i) a mixer configured to receive and mix lithium-bearing material with gypsum, a sulfur-containing material, and a calcium-containing material and form a feed mixture having a moisture content of at least 20 wt %;
(ii) a dryer configured to dry the feed mixture and form a dried mixture having a moisture content of less than 20 wt %;
iii) a roaster configured to receive and roast the dried mixture and form a roasted mixture including a water-soluble lithium compound; and
(iv) a leach tank configured to form a lithium-containing leachate from the water-soluble lithium compound using an aqueous solution.

The apparatus may be located near or connected to a source of lithium-bearing material and be configured to receive this material.

The apparatus may include a comminutor for grinding or crushing the calcium-containing material to form calcium-containing material having a maximum particle size of 88 microns (−170 mesh). Suitably, the comminutor forms calcium-containing material having a maximum particle size of 74 microns (−200 mesh).

The apparatus may include screen or a filter to form calcium-containing material having a maximum particle size of 88 microns (−170 mesh).

The apparatus may include a comminutor for grinding or crushing the gypsum to form gypsum having a maximum particle size of 88 microns (−170 mesh). The comminutor may be a mill such as a ball mill.

The apparatus may include screen or a filter to form gypsum having maximum particle size of 88 microns (−170 mesh).

The mixer may include an impeller or rotor that is configured to mix the feed mixture at a speed ranging from 10-80 rpm. Suitably, the mixer may be a high shear intensity mixer. More suitably, the high shear intensity mixer is a Eirich high intensity mixer.

The mixer may be connected to a tailings pond to receive the lithium-bearing material.

The mixer may be connected to a boric acid plant to receive at least part of the sulfur-containing material such as an alkali metal sulfate. Suitably, the mixer is configured to receive an alkali metal sulfate from boric acid plant liquor or tailings pond. More suitably, the mixer is connected to a crystallises that is configured to separate sodium sulfate from waste material generated by the boric acid plant.

The mixer may be configured to dry and granulate the feed mixture. Suitably, the granules have a mean diameter less than 30 mm. More suitably, the granules have a mean diameter less than 20 mm. Even more suitably, the granules have a mean diameter of 10 mm or less. Yet even more suitably, the granules have a mean diameter ranging from 5-10 mm.

The mixer may be configured to receive alkali metal sulfate generated during the roasting step.

The dryer may be integral to the mixer.

The dryer may be used to reduce the moisture content of the mixed material in the mixer (e.g. the homogeneous mixture) to less than 20 wt %, suitably less than 10 wt %.

The dryer may inject hot air to reduce the moisture content of the feed mixture. The air has a temperature ranging from 50-120° C. Suitably, the air has a temperature ranging from 60-110° C. More suitably, the air has a temperature ranging from 80-110° C.

The apparatus may include a granulator to process the mixture from the mixer into granules.

The granulator may process the mixture from the mixer into granules ranging from 5-20 mm. Suitably, the granules range from 5-10 mm.

The apparatus may include a crystalliser to separate the sulfur-containing material such as sodium sulfate from the roasted mixture from the roaster. This allows the sulfur-containing material to be recycled back to the mixer.

The crystalliser may be configured to perform flash crystallisation. Flash crystallisation is a process which enables the crystallisation temperature to be reached rapidly.

The mixer may be connected to the crystalliser to receive the separated sulfur-containing material.

The roaster may be a calciner or a kiln.

The roaster may be connected to the mixer to recycle alkali metal sulfate (e.g. sodium sulfate) formed during the roasting step to supplement the sulfur-containing material in the feed material.

The apparatus may include a crusher to reduce the particle size of the roasted mixture from the roaster to 1,000-5,000 μm (1-5 mm). Suitably, the particle size of the roasted mixture ranges from 1,000-3,000 μm (1-3 mm).

The leach tank may form part of a counter-current leaching circuit.

The apparatus may comprise three leach tanks arranged in series.

The leach tank may include a filter to generate a lithium-containing leachate having a lithium concentration of at least 2,000 ppm.

The apparatus may include an evaporator to evaporate at least part of the leachate from the leach tank to form a concentrated leachate having a lithium concentration of at least 3,000 ppm.

The evaporator may include a filter to remove impurities from the concentrated lithium-containing leachate.

BRIEF DESCRIPTION OF DRAWINGS

The invention is hereinafter described by way of example only with reference to the accompanying drawings, wherein.

DETAILED DESCRIPTION

The applicant has carried out research and development work 20 on a known method of extracting lithium from lithium-bearing deposit. The known method includes roasting the deposit with calcium carbonate and gypsum and acid leaching the roasted mixture to extract the lithium.

Disadvantages of this process include the use of externally sourced reagents including environmentally hazardous acid. In addition, acid leaching may not be adapted to extract lithium from material containing low concentrations of lithium because of the relatively unselective nature of acid leaching compared to water leaching.

The applicant has discovered that a gypsum/sulfur-containing material mixture can reduce operating costs without losing the efficiency associated with traditional calcium carbonate:gypsum recipes in generating water-soluble lithium compounds. The applicant also discovered that a gypsum/alkali metal sulfate mixture provides a more efficient roasting process compared to a mixture that excludes gypsum.

The applicant also realised that boric acid plants produce sodium sulfate as a waste product which can be routed to the apparatus of the present invention to reduce the amount of sodium sulfate that have to be purchased or synthesised for the present invention.

The applicant further realised that the roasting step may produce in-situ sodium sulfate which can be routed to the apparatus of the present invention to further reduce the amount of sodium sulfate that have to be purchased or synthesised for the present invention.

Figure 1:
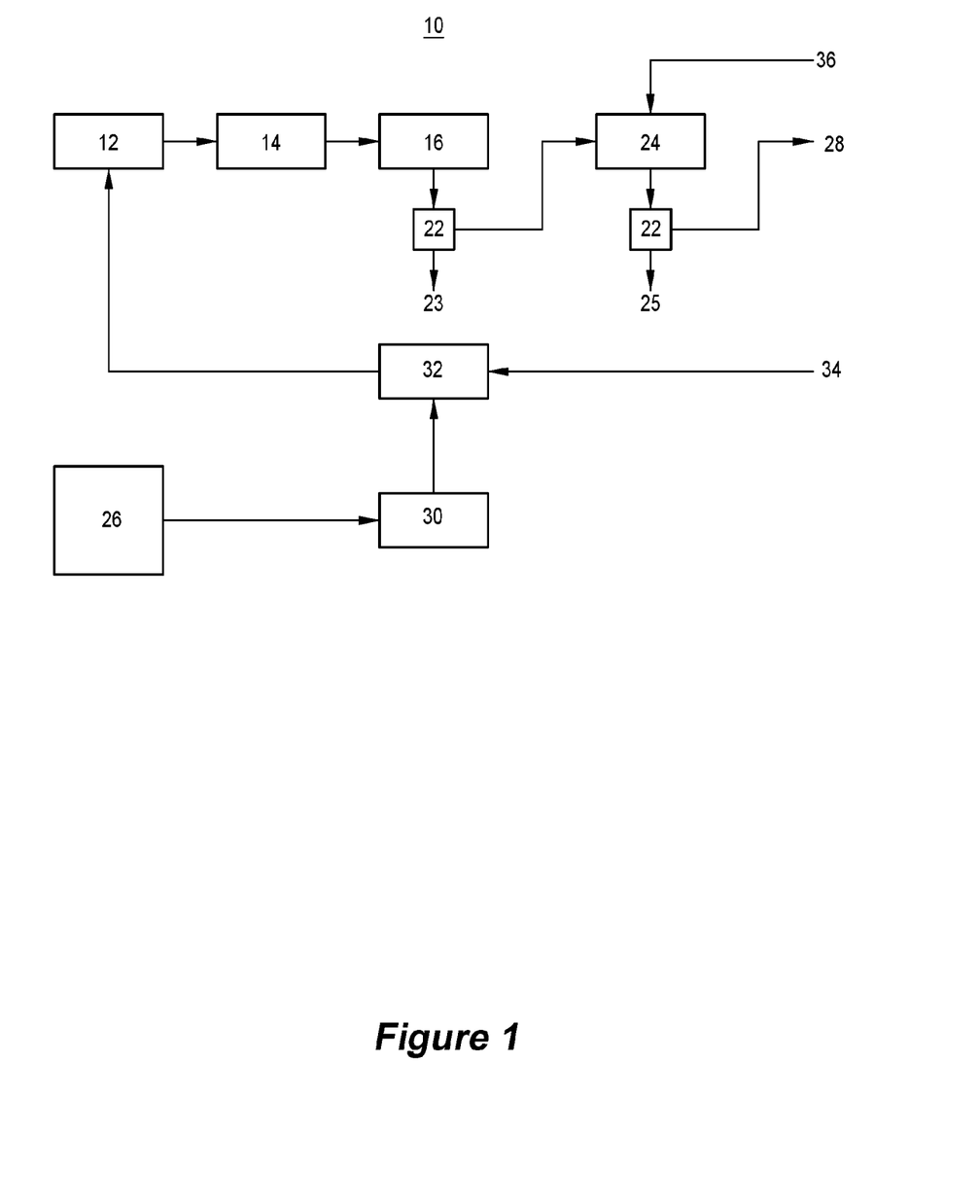
FIG. 1 is a process flow diagram according to one form of the invention.

As a result of these realisations, the applicant has developed an apparatus for extracting lithium from a lithium-bearing material in accordance with the present invention. The apparatus 10 as shown in FIG. 1 comprises a mixer in the form of an Eirich mixer 12, a roaster in the form of calciner 14, and a leach tank 16. It can be appreciated that the Eirich mixer can be replaced with any high intensity mixer.

The apparatus 10 is located near or connected to a source of lithium-bearing material and is configured to receive this material. Examples of suitable lithium-bearing material sources include a tailings pond of a borates mine or clay formations.

Suitably, the apparatus 10 is also located near or connected to a source of an alkali metal sulfate such as sodium sulfate.

The sodium sulfate and lithium-bearing material may be obtained from the same source. For example, the apparatus 10 may be connected to the tailings pond of a boric acid processing plant to receive the lithium-bearing gangue and connected to a sodium sulfate-containing effluent stream of the same plant to receive sodium sulfate.

The apparatus may include a bin 18 to hold the lithium-bearing gangue. The gangue may be dry or wet. In this specification, wet gangue has a moisture content of at least 20 wt %.

When processing dry gangue, the bin 18 is located over a vibrating pan (or screw) that feeds the dry gangue into an impact mill to comminute the gangue. The impact mill in turn feeds the comminuted gangue onto a vibratory screen, preferably having a 40 mesh sieve size, that is positioned over hopper 18.

The hopper 18 stores the classified gangue before it is fed into the mixer 12. In this embodiment, water may be added to increase the moisture content of the gangue to at least 20 wt %.

When handling wet gangue, the gangue from bin 18 is transported directly to the mixer 12.

The other feed material including a calcium-containing material such as calcium carbonate and gypsum can also be stored in separate bins before being fed into the mixer 12.

The mixer 12 is configured to receive inputs of lithium-bearing material, a sulfur-containing material such as an alkali metal sulfate or elemental sulfur, gypsum and a calcium-containing material such as calcium carbonate and mix these materials in specific proportions according to a predetermined roasting recipe, for example the recipes described in Tables 1 and 2 below, to form a homogeneous mixture which is subsequently granulated. The mixer 12 may include or be connected to a dryer to reduce the moisture content of the mixed material and form the granulated mixture.

A product outlet of the mixer 12 discharges the granulated mixture into a bin 42 for delivery to the calciner 14. In another embodiment, the granulated mixture is transported by some conveying system (belt conveyor, screw conveyor, pneumatic conveying, etc) from the mixer 12 to the kiln. Alternatively, the mixer may be connected to a granulator for receiving and granulating the mixed material from the mixer 12.

The granulator may include a dryer to dry the granulated mixture.

Figure 2:
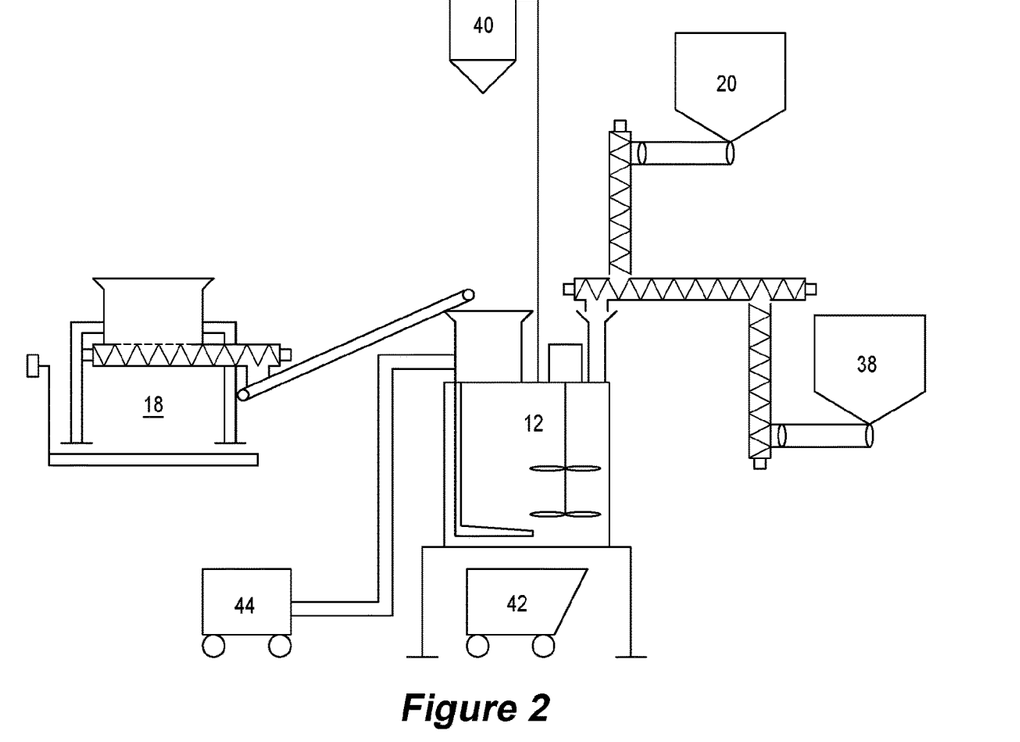
In FIG. 2 is a process flow diagram illustrating the process of forming the granulated mixture according to one form of the invention.

FIG. 2 provides a process flow diagram illustrating an apparatus for forming the granulated mixture. The apparatus comprises a mixer, in the form of an Eirich mixer 12, hopper 18 for storing lithium bearing material, bin 20 for storing limestone (calcium carbonate), and bin 38 for storing gypsum. Reagents including sulfur containing material such as elemental sulfur or an alkali metal sulfate are stored in additional bins or silos before being introduced into the mixer.

When mixing wet feed material including lithium-bearing gangue having a moisture content of at least 20 wt %, glauber salts and glaserite formed during the crystallization step may be pumped from the process into the mixer.

Dust collector 40 controls dust levels during the mixing process and discharge bin 42 receives the granulated mixture.

The Eirich mixer 12 is configured via a conveyor system to receive lithium-bearing material in the form of gangue from a tailings pond of a borates mine or clay formations from bin 18, limestone from bin 20 and gypsum from bin 38. Typically, feed material comprises wet gangue having a moisture content ranging from 40-60 wt %, −200 mesh dry limestone and −200 mesh gypsum. Elemental sulfur or an alkali metal sulfate is delivered into the mixer 12 via a separate bin/silo.

The gangue, limestone, gypsum and the sulfur containing material are mixed under high shear intensity in the Eirich mixer for a minimum of 10 minutes, typically 15-45 minutes to form a homogeneous mixture.

The apparatus further includes a heater/dryer 44 to reduce the moisture content of the mixed material to about 10 wt % or less.

Under the appropriate conditions, a granulated mixture comprising homogenous pellets ranging from 5-20 mm and having a moisture content between 5-10% is formed. In some embodiments, the mixer may be connected to a granulator to granulate the mixed material.

The granulated mixture is discharged into hopper 42 and delivered to a calciner 14. In a continuous process, the granulated mixture is discharged onto a conveyor and delivered to the calciner 14.

The calciner 14 converts the lithium-bearing material into a water-soluble lithium compound such as lithium sulfate.

A product outlet of the calciner 14 is connected to a feed inlet of a leach tank 16 to discharge the calcined material into the leach tank. In some embodiments, the calciner 14 may be connected to a cooler to cool the roasted mixture before it is delivered to the leach tank 16. In these embodiments, the cooler may be connected to a crusher to reduce the particle size of the roasted mixture to 1,000-5,000 μm (1-5 mm).

The crushed compound may be stored in a surge bin to hold the roasted mixture before it is directed to the leach tank 16.

The leach tank 16 is further connected to a water supply to receive water for the leaching step.

The leach tank 16 is configured to enable countercurrent flow of the lithium-bearing feed material and water during leaching of the water-soluble lithium compound to form a lithium-containing leachate.

The applicant discovered that countercurrent flow of the lithium bearing material and water during the leaching process, along with a number of operating parameters, optimised the extraction of lithium from the lithium bearing 30 material. However, co-current leaching may also be performed.

The leach tank 16 may be temperature controlled to enable the leaching process to be performed at a predetermined temperature.

The leach tank 16 may include a filter 22 to remove any undissolved solids 23 formed during the leaching process. Other suitable solid-liquid separation techniques may be used to remove undissolved solids formed during the leaching process, including centrifugation.

The leach tank 16 includes a product outlet which is connected to an inlet of evaporator 24.

A surge tank may be connected to the leach tank 16 to hold the filtered leachate before it is directed to the evaporator 24.

The evaporator 24 receives and concentrates the leachate from the surge tank or directly from the leach tank. Impurities such as calcite, thenardite, glaserite, glauberite, and anhydrite may precipitate during the evaporation process. The leach tank 16 may include another filter 22 to remove the precipitates from the leachate to form a concentrated leachate 28 which can be directed downstream for further processing or stored for later use.

In operation, the apparatus according to the invention is connected to a borates processing plant 26. Feed material comprising lithium-containing waste material, for example from a tailings pond or a stacked heap from the plant, is directed to a flotation circuit 30 to remove some of the non-lithium bearing material from the waste material. The lithium-bearing concentrate exiting the flotation circuit is then directed towards a dryer 32 to reduce the water content of the concentrate, preferably to 20-50 wt % before it is stored in a bin 18. Suitable examples of lithium-bearing material include waste lithium-bearing clay minerals include smectites such as hectorite and/or montmorillonite, Bigadic clays, and lithium bearing illite with or without lithium zeolites that have been subjected to a variety of treatment steps such as roasting in the processing plant. It was discovered that feeding lithium-bearing material having a water content ranging from 20-50 wt % enhanced the roasting step because the water content improves the granulation of the feed material prior to roasting.

Separate bins may be used to store a sulfur-containing material such as elemental sulfur or an alkali metal sulfate, gypsum and calcium-containing material such as calcium carbonate. The alkali metal sulfate may be sourced from an effluent stream typically containing sodium sulfate, from the same plant. In FIG. 2, bin 20 is used to store limestone, bin 38 is used to store gypsum. Elemental sulfur or an alkali metal sulfate is stored in another bin (not shown).

Each of the feed material may be comminuted or screened prior to delivery to their respective bins to limit their maximum particle sizes. For example, the calcium-containing material may be limited to a maximum particle size of 88 microns (−170 mesh), the gypsum may be limited to a maximum particle size of 88 microns (−170 mesh) and the calcium-containing material having maximum particle size of 88 microns (−170 mesh).

These bins are connected to the mixer in the form of a high shear intensity Eirich mixer 12 which receives these materials in specific proportions to form a mixture that will eventually be processed via a series of intermediate steps to form a concentrated lithium-containing solution of at least 4,000 ppm. The gypsum and calcium-containing material are typically sourced externally. The calcium-containing material can be substituted with magnesium carbonate, dolomite or lime.

The sulfur-containing material is used to replace part of the gypsum in the roasting recipe. This reduces the need to commercially source gypsum and may repurpose the waste output from the borates processing plant. Importantly, this arrangement allows commercial value to be extracted from waste products from a boric acid processing plant which would otherwise have been discarded and reduces the reliance on externally sourced reagents. It also improves tailings pond management.

The gangue material may be directed to an impact mill and passed through a classification screen to obtain −40 mesh particles before being fed to the Eirich mixer 12, particularly if the gangue material is dry.

The various components are fed into the Eirich mixer 12 based on a preselected recipe to form a mixture having a lithium-bearing material:calcium carbonate:gypsum:sodium sulfate ratio of 100:30-40:20:20. Another suitable recipe has a gypsum:sodium sulfate ratio of 7:3.

The feed mixture is mixed for 15-45 minutes at a speed ranging from 15-70 rpm to form a homogeneous mixture. A heater is used to reduce the moisture content of the mixed material to about 10 wt % or less to form a granulated mixture comprising homogenous pellets ranging from 5-20 mm and having a moisture content between 5-10%.

In one embodiment, the dried mixture is processed in a granulator to form granules having a mean diameter ranging from 5-20 mm.

The granulated mixture is then directed to a calciner 14 for roasting at a temperature ranging from 857-925° C. for about one hour.

In one embodiment, the mixture may be mixed with water to facilitate the granulation process. This step is typically used on dry feed material having a water content of less than 20 wt %. Alternatively, a wet mixture having a water content of greater than 20 wt % may be fed directly into the granulator.

Examples of suitable roasting recipes wherein the lithium-bearing material is waste lithium-bearing clay material are reproduced in Tables 1 and 2 below.

TABLE 1

Examples of predetermined roasting recipes for lithium-bearing clay including sodium sulfate

| Recipe No | Clay | Limestone | Gypsum | Sodium Sulfate |
|---|---|---|---|---|
| 1 | 100 | 45 | 40 | 10 |
| 2 | 100 | 45 | 45 | 15 |

In Table 1, the mixture is roasted at a roasting temperature of 900° C. for a roasting time period of 60 minutes.

TABLE 2

Examples of predetermined roasting recipes for lithium-bearing clay including sodium sulfate and/or elemental sulfur.

| Recipe No | Clay | Limestone/ Lime | Gypsum | Sodium Sulfate | Elemental S | % Li Recovery | STD. DEV | System recovery % |
|---|---|---|---|---|---|---|---|---|
| 1 | 100 | 45 | 50 | 0 | | 85.2 | 2.1 | 76.7 |
| 2 | 100 | 60 | 30 | 0 | 10 | 84.4 | 1.3 | 75.9 |
| 3 | 100 | 70 | 0 | 0 | 15 | 70.0 | 5.4 | 63.0 |
| 4 | 100 | 65 | 20 | 10 | 10 | 78.7 | 1.2 | 70.8 |
| 5 | 100 | 75 | 0 | 25 | 10 | 73.5 | 2.8 | 66.1 |
| 6 | 100 | 45 | 40 | 10 | | 78.0 | 2.3 | 70.2 |

This roasting step converts the lithium bearing material into a water-soluble form for a subsequent water leaching step.

Representative chemical equations of the roasting process are set out below (Crocker.L Lithium and its recovery from low-grade nevada clays [Report].—[s.l.]: Bureau of Mines, 1988).

$$CaSO_4 \cdot 2H_2O + SiO_2 \rightarrow CaSiO_3 + SO_2 + \tfrac{1}{2}O_2 + 2H_2O \quad (A)$$

and $$Li_2Si_2O_5 + SO_2 + \tfrac{1}{2}O_2 \rightarrow Li_2SO_4 + 2SO_2. \quad (B)$$

Reaction (B) above produces sodium sulfate and/or potassium sulfate which can be recovered and returned to the Eirich mixer 12 to supplement the source of alkali metal sulfate.

The roasted material is fed into the leach tank 16 in countercurrent flow to a leaching solution of water to leach lithium from the formed water-soluble lithium compounds. The solids content of the roasted mixture in the leach tank ranges from 10-40 wt %, suitably about 20 wt %. The roasted mixture may be directed into a cooler before being fed to the leach tank.

The water used in the leaching step is ideally at a pH of 7. However, it can vary between 6.5-7.5 depending on the water source.

In some embodiments, the method may include a step of crushing the roasted material, including the water-soluble lithium compound, before the leaching step. This step may enhance the leaching process. Suitably, the crushed material has a particle size ranging from 1,000-5,000 μm.

The leaching step is performed at a temperature of less than 50° C. The applicant determined that a leaching temperature of about 50° C. optimised the leaching efficiency in view of the inverse relationship of solubility with temperature of lithium sulfate.

During the leaching step, any undissolved solids such as calcium carbonate and clay are removed by filter 23. At this stage, the leachate typically has a lithium concentration of at least 2,000 ppm.

The filtered leachate is then directed to an evaporator 24 to be concentrated.

During the evaporating step, impurities in the form of calcium and sodium salts and particulate matter including any one of more of thenardite, glaserite, glauberite, and anhydrite may be formed. These impurities 25 are removed by filter 22 to form a lithium-containing leachate 28 having a concentration of at least 4,500 ppm. This leachate may be further processed downstream via a series of steps to form lithium carbonate or stored for other uses.

One of these steps involves crystallisation of the lithium-containing leachate to remove further impurities from the solution. In one embodiment, the waste material obtained from the crystallisation step is returned to the flotation circuit 30 via stream 34 to recover lithium from the crystallisation step impurities.

Another step during the production of lithium carbonate is a lithium carbonate precipitation step which generates a filtrate which can be recycled back to the evaporator via stream 36.

Figure 3:
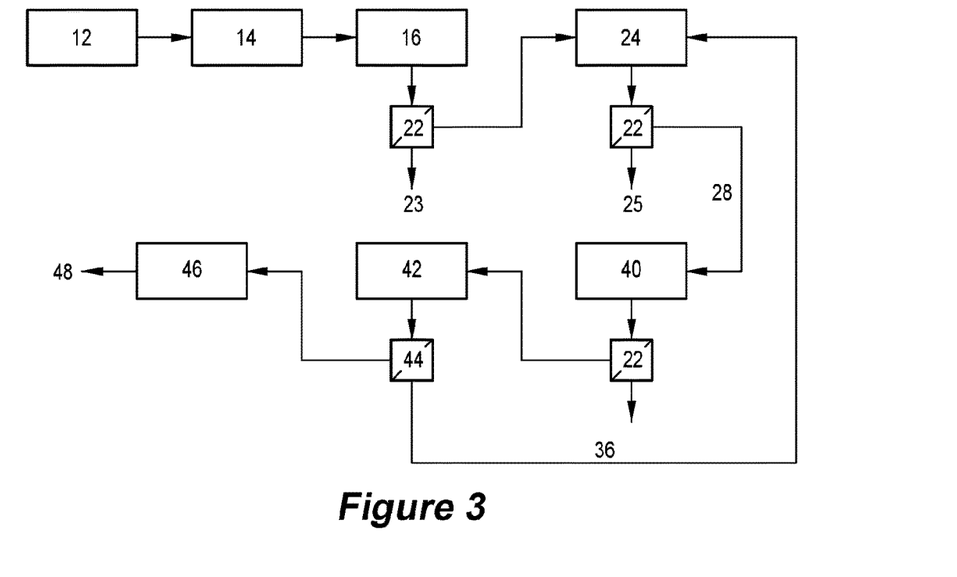
FIG. 3 is a process flow diagram illustrating the process of forming lithium carbonate according to one form of the invention.

FIG. 3 provides a second process flow diagram including unit operations for processing the lithium-containing leachate 28 into lithium carbonate. In this embodiment, the leachate 28 is directed into a crystalliser 40. The filtrate from the crystalliser is transferred into a chamber 42 to precipitate lithium carbonate which is sent into centrifuge 44. The filtrate 36 obtained from the centrifuge 44 is returned to the evaporator 24 while the raw lithium carbonate is processed in refinery 46 into refined lithium carbonate which is subsequently dried and forms the final product 48.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of extracting lithium from a lithium-bearing material including:
    mixing the lithium-bearing material having a moisture content of at least 20 wt %, (i) gypsum, a sulfur-containing material, and a calcium-containing material and forming a feed mixture;
    (ii) optionally granulating the feed mixture to form a granulated mixture;
    (iii) drying the feed or granulated mixture to form a dried mixture having a moisture content of less than 20 wt %;
    (iv) roasting the dried mixture and forming a roasted mixture including a water-soluble lithium compound; and
    (v) leaching lithium from the water-soluble lithium compound and forming a lithium-containing leachate by mixing an aqueous solution and the water-soluble lithium compound.

2. The method according to claim 1, wherein the mixing step involves mixing the lithium-bearing material, gypsum, a sulfur-containing material, and a calcium-containing material at a speed ranging from 10-80 rpm and a mixing time of at least 5 minutes.

3. The method according to claim 1, wherein the sulfur-containing material is either or a combination of an alkali metal sulfate and elemental sulfur.

4. The method according to claim 3, wherein the alkali metal sulfate is either or a combination of sodium sulfate and potassium sulfate.

5. The method according to claim 1, wherein the calcium-containing material is either or a combination of calcium carbonate and lime.

6. The method according to any one of the preceding claims, wherein the lithium-bearing material has a lithium concentration ranging from 1-3 g/kg of lithium bearing material.

7. The method according to claim 1, wherein the mixing step involves adding an aqueous solution to a lithium-bearing material to form lithium-bearing material having a water content of at least 20 wt %.

8. The method according to claim 1, wherein the mixing step forms a feed mixture in which the gypsum:sulfur-containing material ratio is at least 1:1.

9. The method according to claim 8, wherein the mixing step forms a mixture in which the sulfur-containing material is less than 30% of gypsum.

10. The method according to claim 1, wherein the mixing step forms a feed mixture having a predetermined composition comprising lithium-bearing material:
calcium-containing material:gypsum:sulfur-containing material at a ratio of lithium-bearing material (1):calcium-containing material (0.4-0.8):gypsum (0.3-0.5):sulfur-containing material (0.1-0.3).

11. The method according to claim 1, wherein the drying step includes processing the mixture into granules having a mean diameter less than 30 mm.

12. The method according to claim 1, wherein the drying step includes processing the mixture into granules having a mean diameter less than 20 mm.

13. The method according to claim 1, wherein the roasting step is performed at a roasting temperature ranging from 800-1,000° C. for a roasting time period ranging from 15 minutes to 2 hours.

14. The method according to claim 1, including a step of reducing the particle size of the water-soluble lithium compound to 1,000-3,000 μm (1-3 mm).

15. The method according to claim 1, wherein the leaching step includes adding an aqueous solution to the roasted mixture to form a slurry having a solids content ranging from 20-50 wt %.

16. The method according to claim 15, wherein the aqueous solution used in the leaching step has a pH ranging from 6.5-7.5.

17. The method according to claim 16, wherein the aqueous solution used in the leaching step has a pH of about 7.0.

18. The method according to claim 1, further including recycling alkali metal sulfate formed during the roasting step to supplement the sulfur-containing material in the feed mixture.

* * * * *